United States Patent [19]
Hayashi et al.

[11] Patent Number: 5,930,361
[45] Date of Patent: Jul. 27, 1999

[54] VIDEO INVERSION DETECTION APPARATUS AND METHOD

[75] Inventors: Michael Tomoyuki Hayashi, Aurora; Michael Brian Adams, Castle Rock; Louis Dew Williamson, Denver, all of Colo.

[73] Assignee: Time Warner Cable, a division of Time Warner Entertainment Company, L.P., Stamford, Conn.

[21] Appl. No.: 08/777,611

[22] Filed: Dec. 31, 1996

[51] Int. Cl.$^6$ ...................................................... H04L 9/00
[52] U.S. Cl. ................................................. 380/15; 380/10
[58] Field of Search ................................. 380/15, 16, 20, 380/29, 10

[56] References Cited

U.S. PATENT DOCUMENTS

| | | | |
|---|---|---|---|
| 4,222,068 | 9/1980 | Thompson | 380/15 |
| 4,613,901 | 9/1986 | Gilhousen et al. | 380/20 |
| 4,634,808 | 1/1987 | Moerder | 380/29 |
| 5,018,197 | 5/1991 | Jones et al. | 380/20 |
| 5,029,207 | 7/1991 | Gammie | 380/16 |
| 5,034,981 | 7/1991 | Leonard et al. | 380/15 |
| 5,093,718 | 3/1992 | Hoarty et al. | |
| 5,361,091 | 11/1994 | Hoarty et al. | |
| 5,412,720 | 5/1995 | Hoarty | 380/15 |
| 5,588,058 | 12/1996 | Le Berre | 380/20 |

*Primary Examiner*—Salvatore Cangialosi
*Attorney, Agent, or Firm*—F. A. Sirr; Robert G. Crouch; Holland & Hart LLP

[57] ABSTRACT

An apparatus/method for descrambling a TV cable system transmission that has been scrambled using an unknown scrambling algorithm. Insertion apparatus inserts a known visual/electrical characteristic into the TV transmission prior to scrambling by the unknown scrambling algorithm. The scrambled TV transmission, the scrambled insert-characteristic, and an encrypted message that defines the unscrambled insert-characteristic, are sent to all set-tops within the cable system. A set-top descrambler at each system-authorized set-top operates to descramble the scrambled insert-characteristic. The encrypted message is decrypted at each system-authorized set-top, to thereby reproduce the unscrambled insert-characteristic. Comparing apparatus compares the reproduced unscrambled insert-characteristic with the descrambled insert-characteristic, and thereby generates a control signal that is used to control the set-top descrambler to descramble the scrambled TV transmission in a manner that is compatible with the unknown scrambling algorithm.

20 Claims, 9 Drawing Sheets

VIDEO INVERSION DETECTION APPARATUS AND METHOD

BACKGROUND OF THE INVENTION

1. Field of the Invention

This invention relates to multimedia communication networks, such as TV cable systems, that send both broadcast and on-demand features to a number of subscribers, wherein each subscriber location includes a set-top terminal and a television (TV) set that is connected to the set-top terminal. More specifically, this invention relates to a cable TV system wherein system-authorized set-tops are constructed and arranged to reconstruct scrambled TV transmissions or TV pictures independent of a prior knowledge of the method or algorithm by which an unknown and proprietary scrambling system has operated to scramble the TV transmissions that are received by the authorized set-tops.

2. Description of the Related Art

An early commercial installation by Warner Communications Company, under the brand name QUBE, provided an interactive television system.

On demand, interactive, television systems are known in the patent art. U.S. Pat. No. 5,412,720 to Hoarty, U.S. Pat. No. 5,093,718 to Hoarty et al, and U.S. Pat. No. 5,361,091 to Hoarty et al, incorporated herein by reference, are examples.

Video inversion scrambling systems are known and are currently used in most cable TV systems for the purpose of scrambling analog TV signal channels prior to transmission to the set-tops within the cable system. This TV signal scrambling prevents unauthorized subscribers from receiving and viewing the scrambled TV programming. As a scrambled channel is received by an authorized subscriber, that set-top terminal, having a compatible descramble function therein, enables the authorized subscriber to view the programming on a local TV set, usually at an additional cost to that subscriber. An example of the need for subscriber authorization, sometimes called conditional access, is in the well known pay-per-view or view-on-demand industry.

U.S. Pat. No. 4,222,068 to John R. Thompson, incorporated herein by reference, is an example of TV signal scrambling. In this patent, a subscriber TV system comprises a video encoder means for randomly inverting the polarity of a trace line of randomly selected vertical intervals, and by inverting the trace lines of associated fields following the randomly selected vertical intervals, the encoder means further including means for suppressing the amplitude of randomly selected horizontal blanking pulses during the fields of the video signal that form a scrambled video signal.

Figure 1:
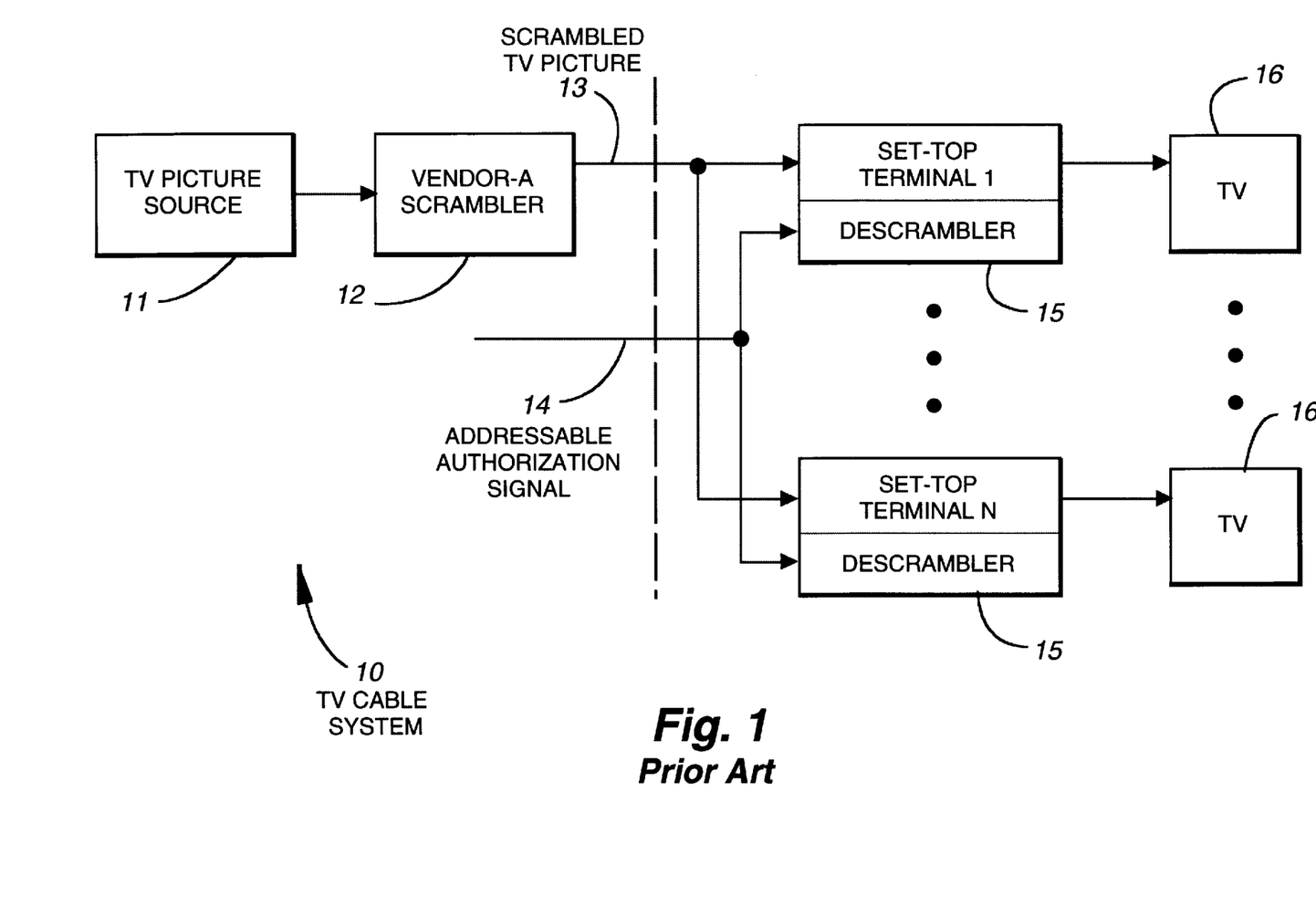
FIG. 1 is a showing of a prior art cable TV system having a TV picture source, a proprietary scrambler, and a plurality of set-tops that are each configured to unscramble a TV transmission when the set-tops are individually authorized to do so.

Another example is shown in FIG. 1 wherein cable TV system 10 includes a TV picture source 11 and a proprietary scrambler 12. In this example, scrambler 12 is proprietary to a third party herein referred to as vendor-A. Scrambler 12 operates to scramble the TV transmission or picture signals that are transmitted on channels 13, thereby preventing unauthorized subscribers from receiving and viewing the scrambled TV programming that is transmitted on channels 13. In FIG. 1, the system subscribers are represented as a plurality N of set-tops 1 through N. Each of the N set-tops is uniquely addressable, as is well known to those of skill in the art.

In FIG. 1, set-top 1 is seen as receiving a viewing-authorization, or permission-to-descramble, signal 14 from cable system 10, this signal being addressed only to set-top 1. As a scrambled channel 13 signal is received by the authorized subscriber having set-top 1, descrambler 15 enables set-top 1 to view that programming on its local TV set 16. While not shown, each set-top in the system also receives an encrypted message that provides each authorized set-top with the scramble-key. This key enables each authorized set-top to descramble the scrambled signal channel 13 signal.

Such a scramble/descrambler video inversion system is usually proprietary to the stated vendor-A that provides the set-top terminals 1–N to the operator of cable system 10. More particularly, each of the N set-tops contains a proprietary controller that includes the descramble function 15.

In the event that the operator of cable system 10 decides to change the vendor of its set-tops, for example, from vendor-A to a new vendor-B, then the cable system operator is faced with the problem of completely changing all set-stops to the new vendor-B, or in one way or another, the scramble/descramble system of vendor-A must be reverse-engineered, and vendor-B must install a system that is compatible with the proprietary system of vendor-A, thereby providing a cable TV system 10 that comprises a mix of set-tops manufactured by vendor-A and manufactured by vendor-B.

The present invention fills the need in the art for a cable system that enables a set-top manufactured by any vendor to, upon proper receiving authorization, reconstruct scrambled TV pictures, regardless of the proprietary scrambling system that was used to initially scramble the TV pictures. The construction and arrangement of the present invention operates to provide similar security to that of the original cable system in that only authorized set-tops are enabled to view or descramble the TV pictures.

SUMMARY OF THE INVENTION

In summary, the present invention inserts a marker, or reference level, into a TV picture pixel, or within a horizontal scan line of the video signal, prior to scrambling of the pixel or video scan line by operation of a system-scrambler. The properties of this marker, for example its color, voltage level, and its physical location within the scan line, are transmitted to all of the cable system set-tops as an encrypted signal. Only certain ones of the set-tops are authorized to view the TV transmission (called conditional access or CA). At these authorized set-tops, this encrypted signal is decrypted to thereby recreate the original marker. In addition, the TV transmission is descrambled using the descramble algorithm that is currently running at the authorized set-tops. The recreated original marker is now compared to the descrambled marker. When a difference is detected, that set-top descrambler is controlled to operate with a descramble algorithm that is compatible with operation of the system-scrambler.

Continuing with the above vendor-A/vendor-B example, it will be assumed that the cable TV system 10 to be described comprises a mix of set-tops 22 by vendor-A and set-tops 20 by vendor-B.

Figure 2:
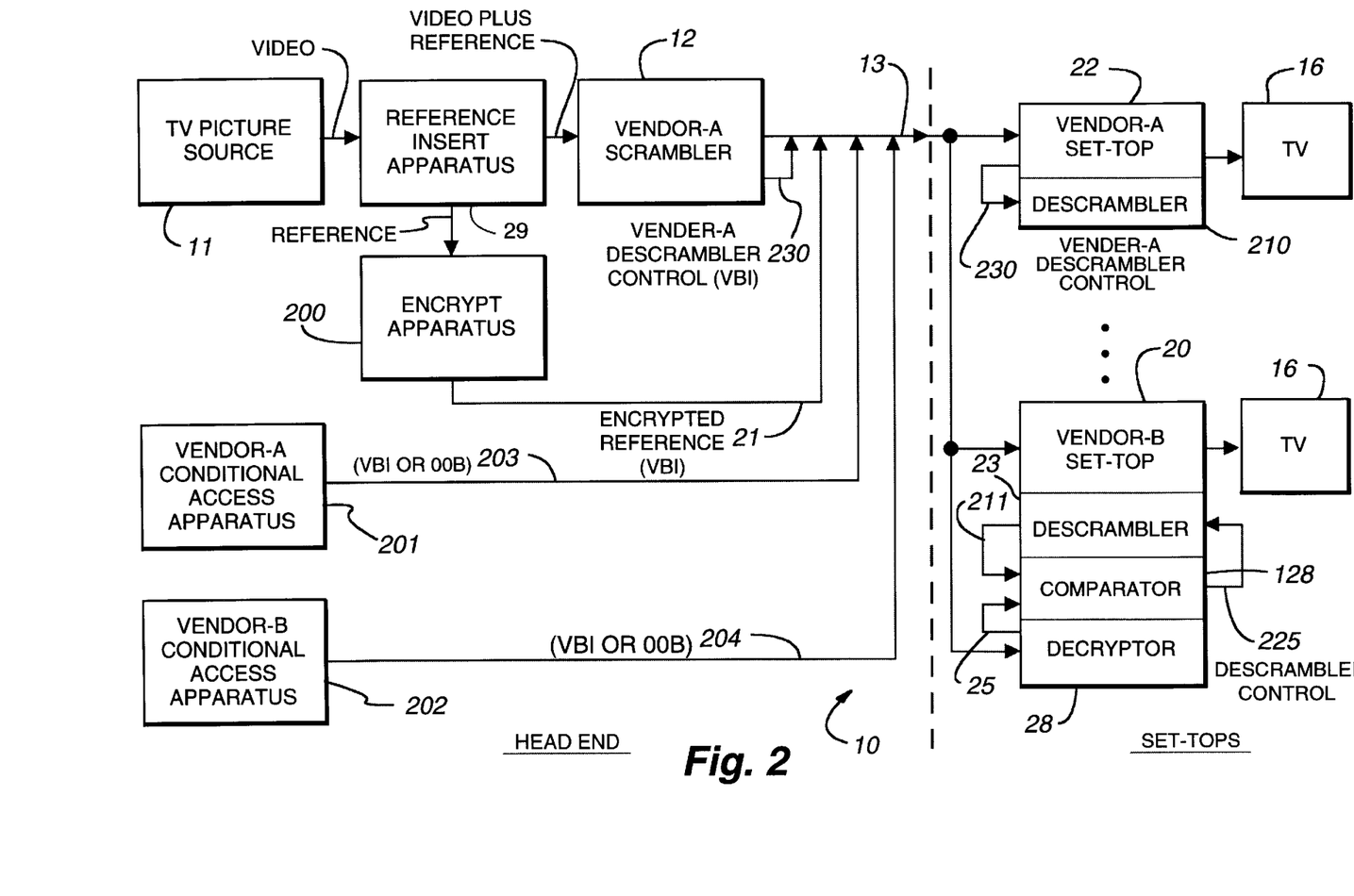
FIG. 2 is a showing of a cable TV system in accordance with the present invention, wherein the system set-tops comprises a mix of set-tops, some of which are of the type shown in FIG. 1 that are configured to unscramble the TV transmission when the set-tops are individually authorized to do so, and some of which operate in accordance with the present invention to reconstruct or unscramble the scrambled TV transmission, when authorized to do so, independent of a prior knowledge of the algorithm that was used by the proprietary scrambler that operated to scramble the TV transmission.

The present invention provides a cable system/apparatus/method 10, as shown in FIG. 2, whereby an authorized vendor-B set-top terminal 20 is enabled to reconstruct scrambled TV pictures, independent of a prior knowledge of the method by which an unknown and proprietary vendor-A scrambling system 12 has operated to scramble TV pictures that are received by vendor-B set-tops 20 from the cable system generally identified by numeral 10. As is well known, cable system 10 may comprise a master head-end, a number of hubs that each individually serve a large number of subscribers, a number of nodes for each individual hub wherein each node serves a small number of the subscribers, and an interconnected hybrid fiber coaxial network.

In operation, the present invention uses a reference insert device or apparatus 29 to insert, or encode, a marker or insert of known visual/electrical characteristics at a known physical position within a known line of the user-veiwable video picture that is defined by TV picture source 11. In accordance with this invention, this insert function 29 can take place within the Vertical Blanking Interval (VBI) of the video picture, or perhaps in an Out-Of-Band (OOB) channel of the headend's transmission. In any event, insert function 29 occurs prior to scrambling of video picture 11 by use of the unknown and proprietary vendor-A scrambling apparatus/method at 12.

TV pictures 11 and the above-mentioned known visual/electrical characteristics inserted by device 29, are scrambled using the unknown and proprietary vendor-A scrambling apparatus/method at 12. This produces a scrambled TV signal 13 that is then sent to all N set-tops within cable system 10. As stated above relative to FIG. 1, each of the set-tops in cable system 10 are uniquely addressable.

The known insert characteristics, known physical position, and known scan line are also sent in encrypted form to all set-tops within the cable system by way of the operation of an encrypting apparatus 200 that is located at the headend, and by way of its output signal 21 that is contained within transmitted signal 13. While shown in FIG. 2 as a separate signal 21, preferably the encrypted signal 21 information is sent to all N set-tops within the VBI of the TV scan lines. As is well known, the VBI comprises the unused lines in each field of a television signal which are seen as a thick band when the television picture rolls over. Some of the VBI lines may be used for teletext and captioning, or may contain specialized test signals.

The cable system's headend also includes a vendor-A conditional access apparatus 201 and a vendor-B conditional access apparatus 202. These two CA apparatus are individually different and are proprietary to these two vendors. The respective outputs 203,204 operate to authorize only certain addressed ones of the vendor-A and vendor-B set-tops to descramble and view transmission 13. Scrambled TV signal 13 includes the first authorization signal 203 for vendor-A set-top 22, as well as the second authorization signal 204 for vendor-B set-top 20. In this way, both of the set-tops 22,20 are individually authorized, each in a different proprietary manner, to descramble and view transmission 13. For example, an authorization signal 203,204 may be transmitted and stored at an addressed set-top 22,20, for use during a calendar month period. In the event that a set-top does not retain its authorized status at the beginning of a the next month, this stored authorization signal is automatically erased by operation of the headend.

In summary, the headend's transmission 13 contains the following six components; (1) a scrambled TV picture signal that is to be viewed at all authorized TVs, (2) periodic CA signals for the vendor-A set-tops, (3) periodic CA signals for the vendor-B set-tops, (4) a vendor-A descrambler control signal that is used by only the vendor-A set-tops, (5) a scrambled insert characteristic that is used by only the vendor-B set-tops, and (6) an encoded or encrypted insert characteristic that is used by only the vendor-B set-tops.

The authorized and compatible vendor-A set-tops, such as set-top 22, that are within cable system 10 will, of course, operate in a well-known manner to properly descramble scrambled TV signal channel 13, and will visually display the descrambled TV picture on their associated TV set 16. In this operation, the above-mentioned encrypted insert-or reference information 21 is not used by the vendor-A set-tops.

All vendor-B set-tops, such as set-top 20, are provided with a decryptor apparatus 28 that enables an authorized vendor-B set-top 20 to decrypt the received insert information 21 that is provided as a portion of transmission 13. Note that only authorized vendor-B set-tops are enabled to descramble transmission 13 using their descrambling apparatus/method 23. The vendor-B descrambler or video inversion apparatus/method 23 is different from the vendor-A descrambler 210 that is within set-top 22, but it is a known apparatus/method to the controller/logic within each vendor-B set-top.

At each authorized or addressed vendor-B set-top 20, a comparator apparatus 128 makes a comparison between (1) the decrypted information 25 that defines the visual/electrical insert characteristic, scan line position and scan line of reference insert apparatus 29, and (2) the reference insert characteristic 29 portion 211 of the descrambled received transmission 13. Note that whereas scrambling was originally performed using the apparatus/method 12 of vendor-A, descrambling of the received transmission 13 is produced using the known apparatus/method 23 of vendor-B. This comparison 128 enables the vendor-B set-top 20 to determine the original vendor-A scrambling algorithm within the headend's apparatus/method 12. In this manner, vendor-B set-top 20 operates to feed a descramble control signal 225 to its descrambler 23, control signal 225 enabling its descrambler 23 to operate in a manner that is compatible with vendor-A's scrambler 12, to thereby properly restore transmission 13 to a TV-viewable state.

Stated in another way, portions of the TV picture 11 that are to be scrambled using an unknown vendor-A scrambling technique 12 are modified at 29 to include known encoded characteristics. At vendor-B set-top 20, the result 211 of the vendor-B descrambling of the known-encoding picture portions or portions 29 is compared at 128 to what would be expected, as defined by signal 25, had these picture portions 29 been descrambled using the vendor-A technique currently running at 12. This comparison of actual-to-expected, i.e. 211-to-25, yields a signal 225 whereby the vendor-A scrambling technique 12 is detected. As a result, operation of the vendor-B set-top descrambler 23 is altered, or modified, by signal 225 to properly restore the vendor-A scrambled TV transmission 13. For example, the descramble algorithm of descrambler 23 is changed to be compatible with the scrambling algorithm of cable-system scrambler 12 and to be the same as the descramble algorithm of descrambler 210 that is within vendor-A set-top 22.

Note that in accordance with the present invention, all compatible set-tops 22 of vendor-A receive a vendor-A descrambler control signal 230 as a portion of the headend's transmission 13, whereas all non-compatible vendor-B set tops 20 internally generate their own descrambler control signal 225. While descrambler control signal 230 is received by all set-tops within cable system 10, only the vendor-A set-tops are able to make use of this signal.

An object of the present invention is to provide a video-inversion scramble detection apparatus for use in descrambling a TV cable system's TV transmission that has been scrambled using a system scrambling algorithm, wherein an insertion means operates to insert an insert-characteristic into the TV transmission prior to scrambling by the system scrambling algorithm, wherein an encryption means generates an encrypted message that defines the unscrambled state of the insert-characteristic, wherein a transmission means transmits the scrambled TV transmission, the scrambled insert-characteristic, and the encrypted message to a plurality of set-tops, wherein an authorization means transmits an authorization signal to only certain ones of the set-tops, wherein a set-top descrambler at the authorized set-tops operates to descrambling the scrambled insert-characteristic, wherein a decryption device at the authorized set-tops operates to decrypt the encrypted message and thereby provide a reproduction of the insert-characteristic, wherein a comparing means at the authorized set-tops operates to compare the descrambled insert-characteristic with the reproduced insert-characteristic, and wherein a control signal is thereby generated as a function of this comparison, this control signal then operating to control the set-top descrambler at the authorized set-tops in a manner to cause these descramblers to descramble the scrambled TV transmission in a manner that is compatible with the system scrambling algorithm.

These and other objects, advantages, and features of the present invention will be apparent to those of skill in the art upon reference to the following detailed description of the invention, which description makes reference to the drawing.

BRIEF DESCRIPTION OF THE DRAWING

FIGS. 4 and 5 are flowchart function/apparatus/method showings of the present invention, wherein FIG. 4 shows the portion of the present invention at the head end of the cable system shown in FIG. 2, whereat a vendor-A scrambler is used to scramble a TV transmission prior to transmission to all set-tops in the cable system, and wherein FIG. 5 shows the portion of the present invention at the viewing-authorized vendor-B set-top of FIG. 2.

DETAILED DESCRIPTION OF THE PREFERRED EMBODIMENT

A non-limiting example of the present invention assumes that a TV transmission 13 will be scrambled using well-known sync suppression and video inversion, and that the resulting scrambled TV transmission 13 will be sent to all of the subscribers within cable system 10 having a number of receiving set-tops, including at least some set-tops 20 that are constructed and arranged in accordance with the present invention.

In accordance with the present invention, and before scrambling TV transmission 13, a reference signal 29, or more specifically, two or more known reference signals, are inserted into TV transmission signal 13 prior to scrambling at 12. These two reference signals are inserted into a TV picture signal 11 at two or more different physical locations such that the TV picture quality is not impaired, and such that the first reference signal will be scrambled, whereas the second reference signal will not be scrambled.

The scrambled TV transmission 13 is then sent to all cable system subscribers. Each subscriber has a set-top that is either compatible with the originating scrambler 12, or is constructed and arranged in accordance with the present invention. Each set-top in the cable system is uniquely addressable, and authorization signals 203,204 are addressed only to those set-tops that are authorized to view the scrambled TV transmission 13.

In addition, an encrypted message 21 is sent to each set-top in the cable system. This encrypted message contains an encryption of the first and second reference signals in their unscrambled form. This encrypted message is preferable sent via the VBI of transmission 13, or perhaps by way of an OOB channel.

At each authorized receiving set-top 20 in accordance with this invention, encrypted message 21 is decrypted, to thereby reproduce the first and second reference signals. In addition, at each authorized set-top 20 in accordance with this invention, the received and descrambled first reference signal and the received second reference signal are compared, respectively, to the decrypted and reproduced first and second reference signals.

This comparison is then used to control the descrambling function 23 of each authorized set-top 20 that is constructed in accordance with this invention, such that the descrambler 23 within each of these authorized set-tops is enabled to restore a received TV transmission 13 to its original picture quality.

As a feature of this invention, the above-mentioned first and second reference signals are inserted into known scan line positions of a TV picture signal 11 prior to scrambling, and the above-mentioned encrypted message 21 includes these known scan line positions.

As an additional feature of this invention, the characteristics and scan line location of the above-mentioned first and second reference signals can be randomized, whereupon the encrypted message 21 will include information allowing authorized set-tops 20 in accordance with this invention to find and then utilize the inserted first and second reference signals.

As an additional feature of this invention, the encryption algorithm at apparatus 200 that is used to encrypt reference characteristics 29 can also be randomized.

By way of a specific non-limiting example of the above technique, assume that the first reference signal, i.e. the reference signal that is scrambled, comprised a green dot that is located at a given scan line position that will not appreciably effect picture quality. Also assume that this first reference signal is received and descrambled into a yellow dot. The receiving set-top in accordance with this invention then operates to reconstruct the original TV picture using this green-to-yellow information as a control input to its descramble function.

By way of another example of the above technique, a first reference signal A is added to the upper left hand corner of a viewable TV picture, and a second reference signal B is added to the lower right hand corner of the viewable TV picture. As stated, both of these reference signals are quite small in physical size, and they do not affect the picture viewing quality of the TV picture. In operation of the cable system's scrambler 12, the physical location of the first and second reference signals results in scrambling of only the second reference signal B.

Operation of the present invention now encrypts the first reference signal A, so that the relationship to the second reference signal B is concealed. The result is an encryption message states the relationship of reference signal A to reference signal B.

The scrambled TV picture, the scrambled reference signal A, the unscrambled reference signal B, and the encryption message are now sent to all set-tops in the cable system. All authorized set-tops in accordance with this invention now decrypt the encryption message, and then compare the decrypted reference signal A to the reference signal B that is received by these set-tops. These set-top then descramble the scrambled TV picture using this comparison data.

Figure 3:
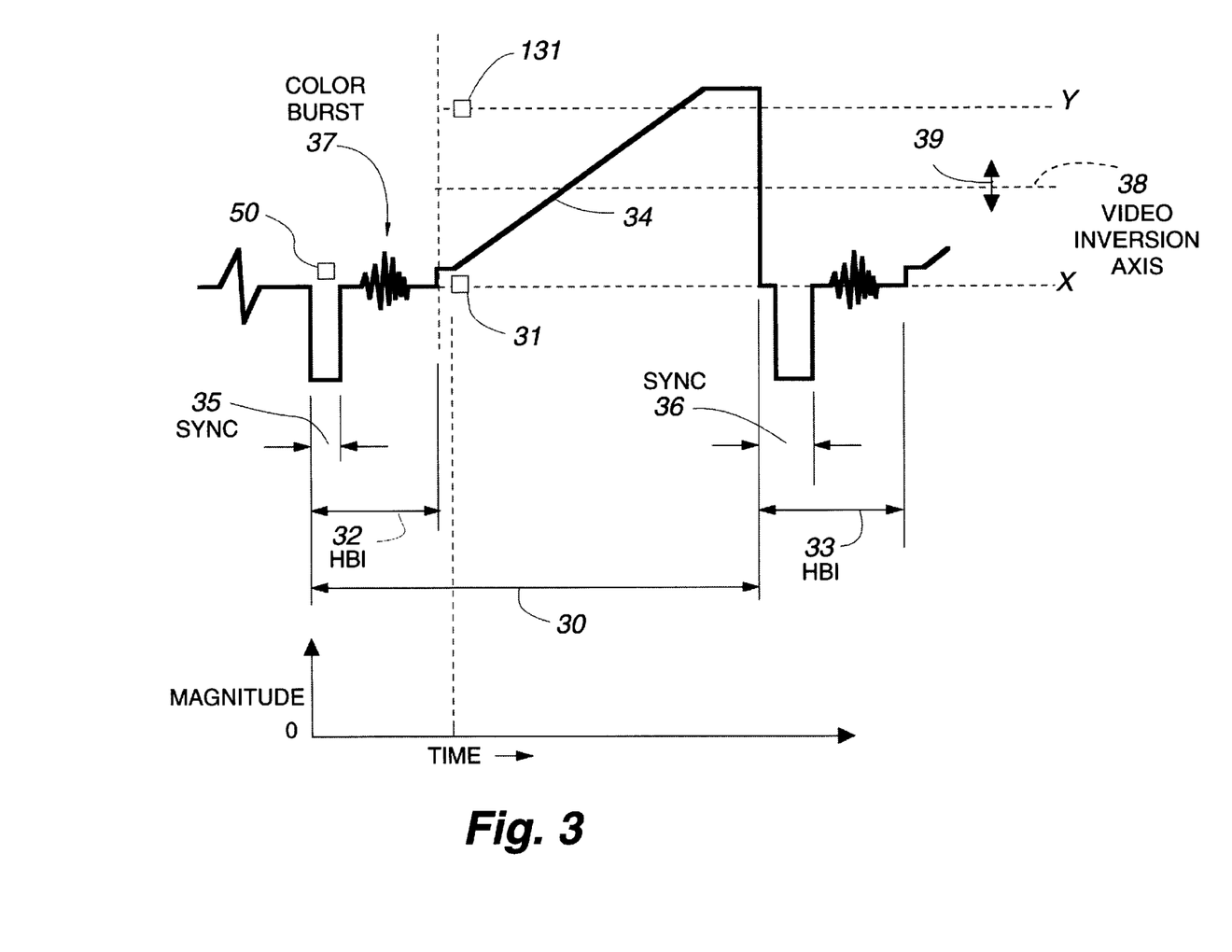
FIG. 3 is a simplified showing of a single unscrambled video scan line that illustrates operation of the FIG. 1,2 scrambler, and that also illustrates the insertion of a video characteristic into the scan line in accordance with the present invention.
Figure 3A:
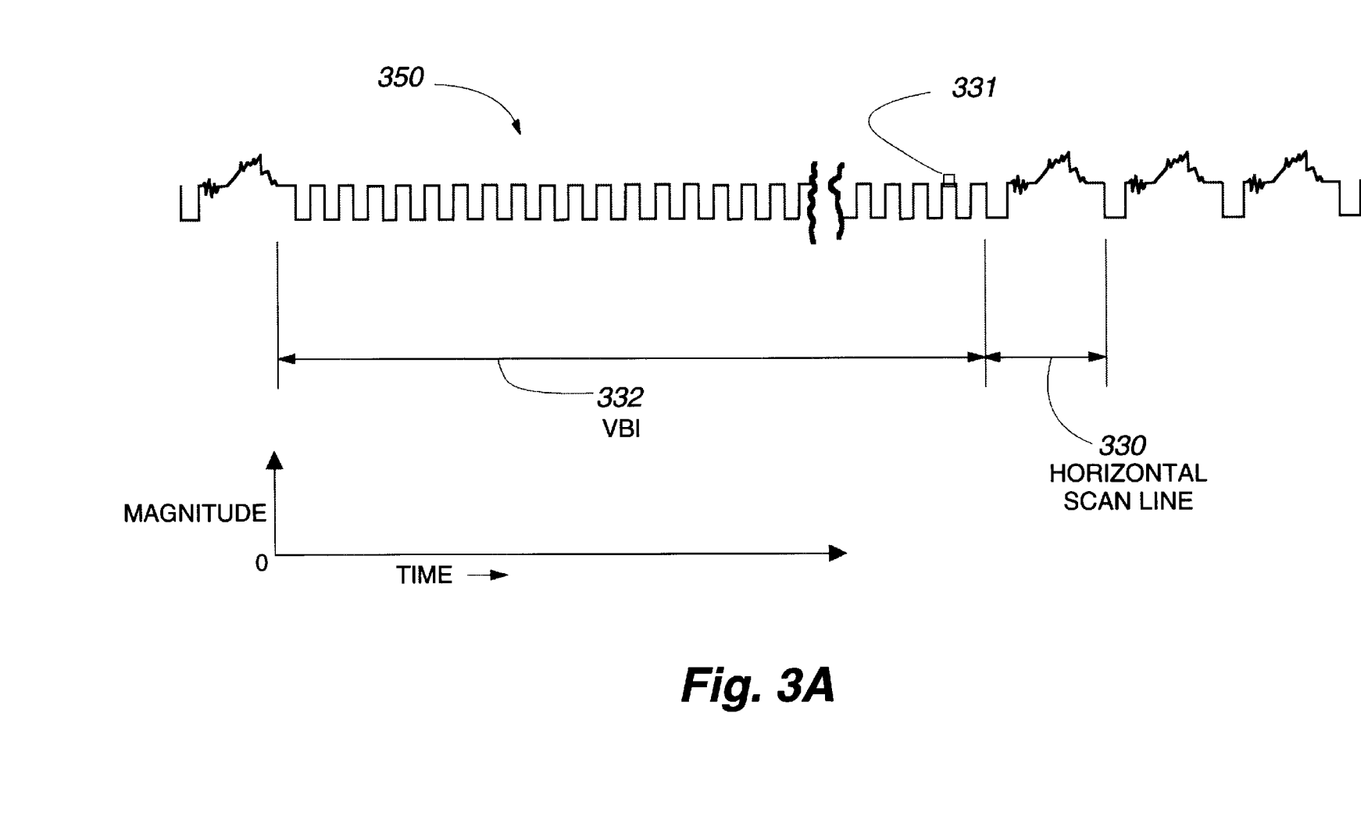
FIG. 3A is a simplified showing of a video signal that illustrates operation of FIGS. 1, 2 scrambler and that also illustrates the insertion of a video characteristic into the VBI portion of the video signal.

FIG. 3 is a simplified showing of one horizontal, unscrambled, horizontal video scan line 30 that useful in illustrating operation of the FIGS. 1, 2 scrambler 12. FIG. 3 also illustrates the insertion of a video characteristic 31 into scan line 30 prior to scrambling by scrambler 12, in accordance with the present invention. FIG. 3A illustrates the insertion of a video characteristic 331 into VBI portion 332 of the video signal prior to scrambling.

FIG. 3 plots time on the X axis and electrical magnitude on the Y axis. Scan line 30 is simplified to show a nontypical linear picture portion 34; i.e., one scan line of the picture tube that is within a TV 16. As is well known, the scan lines of FIG. 3 comprise two sync portions 35, 36, two Horizontal Blanking Interval (HBI) portions 32, 33, and picture portions 34. As is usual, a color burst 37 may be included in the HBI.

Known methods of scrambling a scan line include the elimination of one, or both, of sync portions 35, 36. Other known methods of video inversion scrambling techniques operate to invent picture portion 34 about a video inversion axis 38. As is shown by arrow 39, the video inversion algorithm of the FIGS. 1, 2 scrambler 12 operates to set inversion axis 38 to variable or changeable magnitudes in accordance with the currently running scrambling algorithm. Note that known video inversion scrambling techniques do not invert the VBI or the HBI.

Usually, a commercial scrambling system 12 will use both the above-described described sync suppression technique and the above-described video inversion technique.

As is usual, the currently running scrambling algorithm is encrypted and sent to all set-tops within cable system 10. In addition, certain set-tops contain a compatible decryption device. When individual ones of these compatible set-tops also receive an authorization signal, these authorized set-tops tops operate to decrypt this algorithm message. In this manner, these compatible and authorized set-tops are enabled to descramble the TV transmission for viewing on their associated TV set.

In FIG. 1, all of the N set-tops 15 contain the compatible decryption device. In FIG. 2, only the vendor-A set-tops 22 contain the compatible decryption device.

In accordance with the present invention, operation of insert device 29 of FIG. 2 causes an insert 31 to be placed in either VBI 332 of FIG. 3A, or in picture portion 34 of FIG. 3. As is shown in FIG. 3, insert 31 can be identified by a time location characteristic T, and by a magnitude location characteristic X. In addition, insert 31 can be identified by a color characteristic; for example, red. By way of example it will be assumed that the character identification of insert 31 is X,T.

With reference to FIG. 2, this character identification X,T is encrypted, and a resulting message comprises encrypted coding message 21 of FIG. 2. All non-compatible set-tops that are within cable system 10, for example set-top 20 of FIG. 2, are provided with a decryption algorithm 28 whereby, upon being authorized to do so, set-top 20 is enabled to decrypt message 21, and thereby recover or reconstruct the original X,T characteristic 29 of insert 31.

Again with reference to FIG. 3, after video inversion of scan line 34 about video inversion axis 38, i.e. after scrambling of scan line 34 by operation of scrambler 12, insert 31 appears at characteristic location Y,T (i.e., 131 of FIG. 3), wherein Y is of a greater magnitude than the original unscrambled magnitude X. This scrambled version of scan line 34, including scrambled insert 131, comprises the FIG. 2 scrambled TV picture 13 that is sent to all of the N set-tops that are within cable system 10.

Assume now that the descramble algorithm 23 that is currently running on vendor-B set-top 20 of FIG. 2 is not operating in a manner that is compatible with the cable system's inversion axis 38 of FIG. 3. In this case, the descrambling of scrambled insert 131 will produce a characteristic (i.e., output 211) of, for example, Z,T, i.e. the original insert characteristic of X,T has changed to Z,T. by the current operation of descrambler 23

Remembering that set-top 20 has been informed by encrypted message 21 that a properly descrambled insert 131 should yield the characteristic X,T, a comparison device 128 that is within vendor-B set-top 20 now operates to compare the expected characteristic 25 of X,T to the descrambled characteristic 211 of Z,T, and as a result of this comparison, descrambler 23 of set-top is controlled by output 225 to cause descrambler 23 to thereafter operate with a video inversion descramble algorithm that is compatible with inversion axis 38 of FIG. 3. Stated in another way, control output 225 varies as a function of the difference between the original insert characteristic X,T, or 25, and the descrambled insert characteristic Z,T, or 211.

As a feature of this invention, a second insert-characteristic 50 of FIG. 3 can be inserted into HBI 32, whereat sync 35 has been suppressed. This second insert-characteristic 50 will not be inverted by operation of FIG. 2's scrambler 12. This second insert-characteristic 50 is also encrypted, and the resulting message comprises a portion of encrypted coding message 21 of FIG. 2. All non-compatible set-tops that are within cable system 10, for example set-top 20 of FIG. 2, are provided with a decryption algorithm whereby, upon being authorized to do so, set-top 20 is enabled to decrypt message 21, thereby recovering or reconstruct the original characteristic of this second insert-characteristic 50.

Comparison device 128 that is within each vendor-B set-top 20 now operates to compare the reconstructed second insert-characteristic 50, as obtained from message 21, to the second insert-characteristic 50 that was received by set-top 20 as the unscrambled portion of transmission 13. As a result of this comparison, descrambler 23 of set-top 20 is additionally controlled by output 225 to cause descrambler 23 to operate using a video inversion descramble algorithm that is compatible with inversion axis 38 of FIG. 3.

FIG. 3A is a simplified showing of a video signal 350 that illustrates the insertion of a video characteristic 331 into the VBI portion 332 of signal 350. As shown in FIG. 3A, VBI 332 precedes a serial number of horizontal scan line intervals 330, each interval 330 being generally as shown in FIG. 3.

Figure 4:
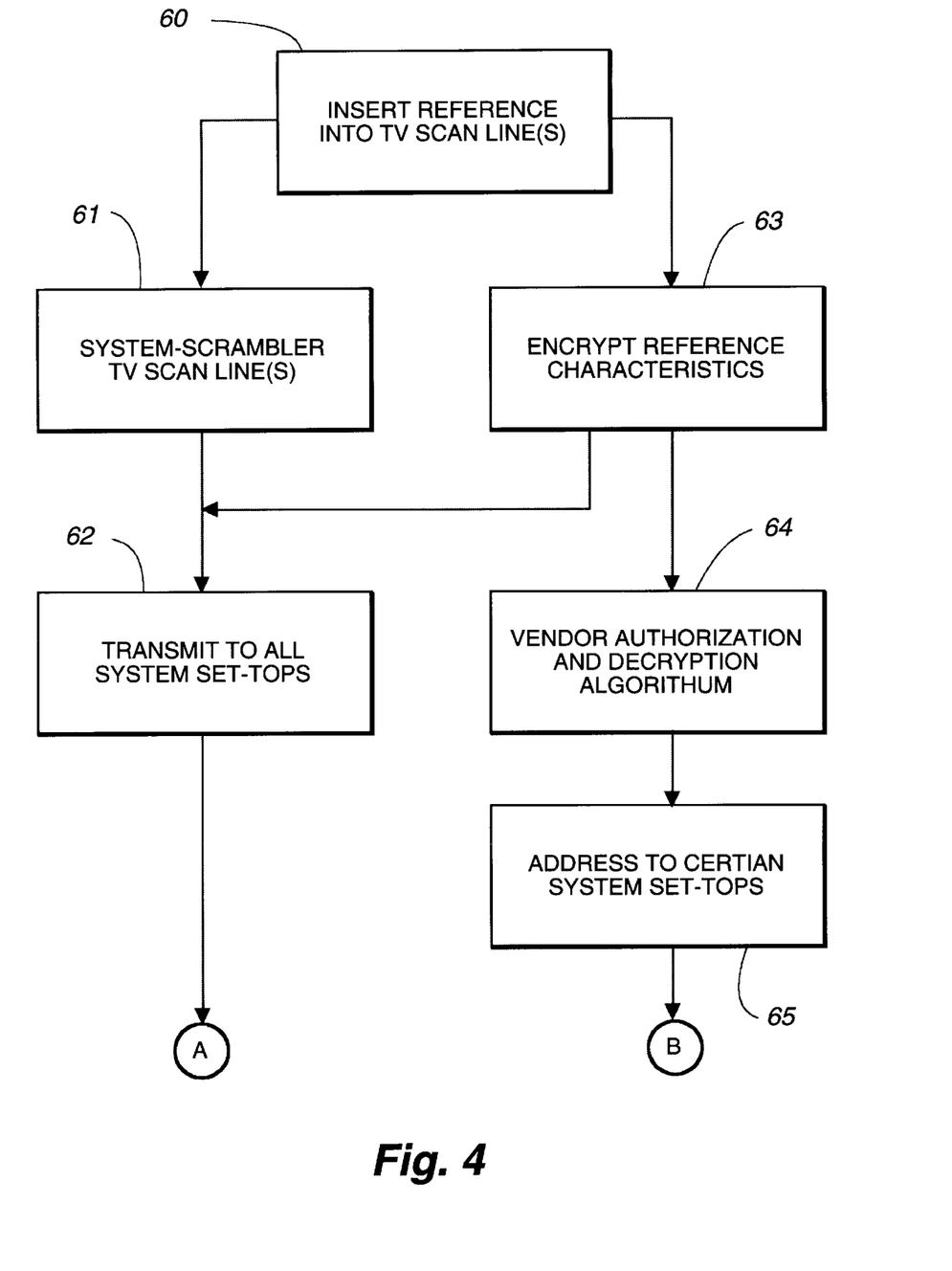
Figure 5:
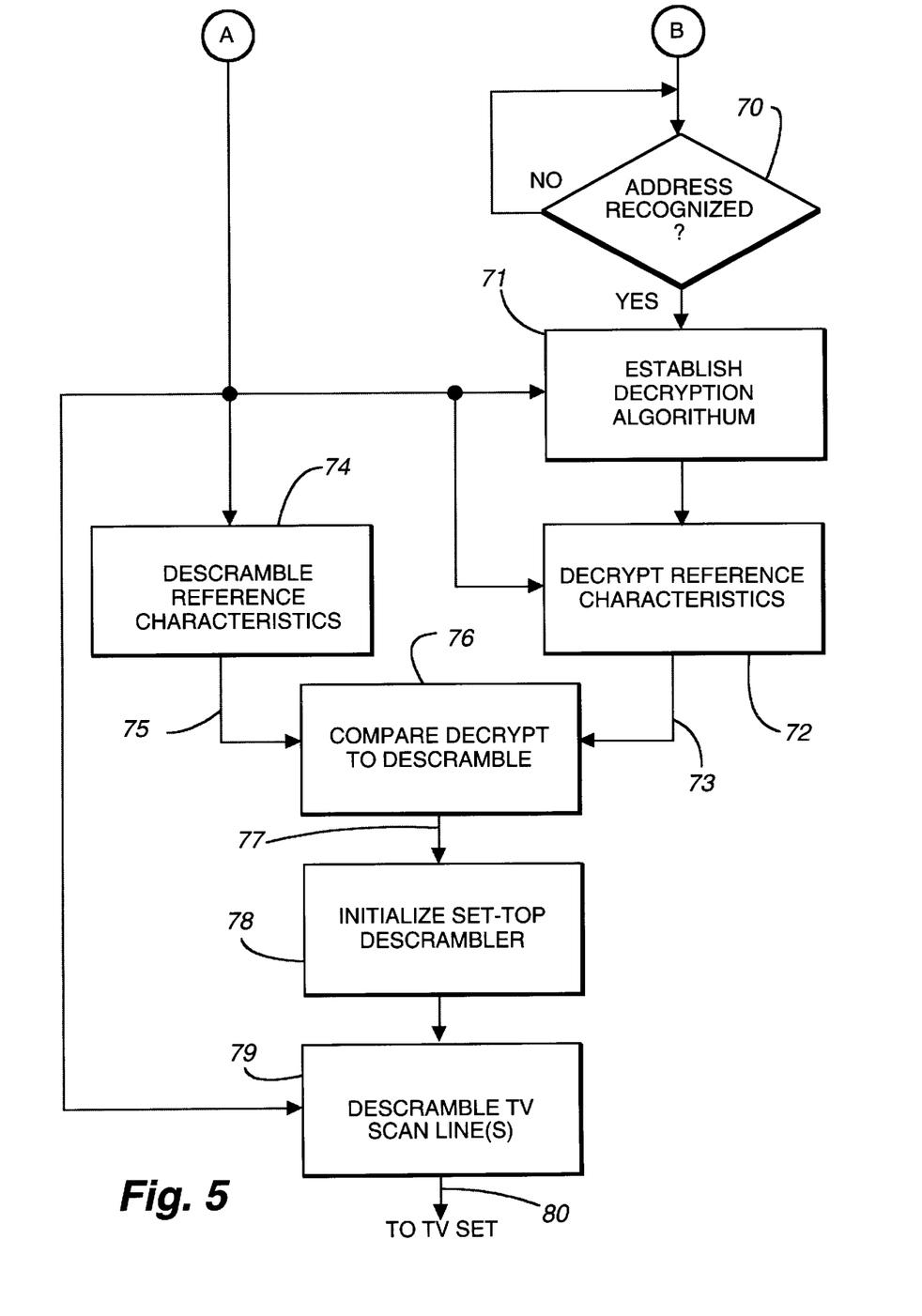
Figure 6:
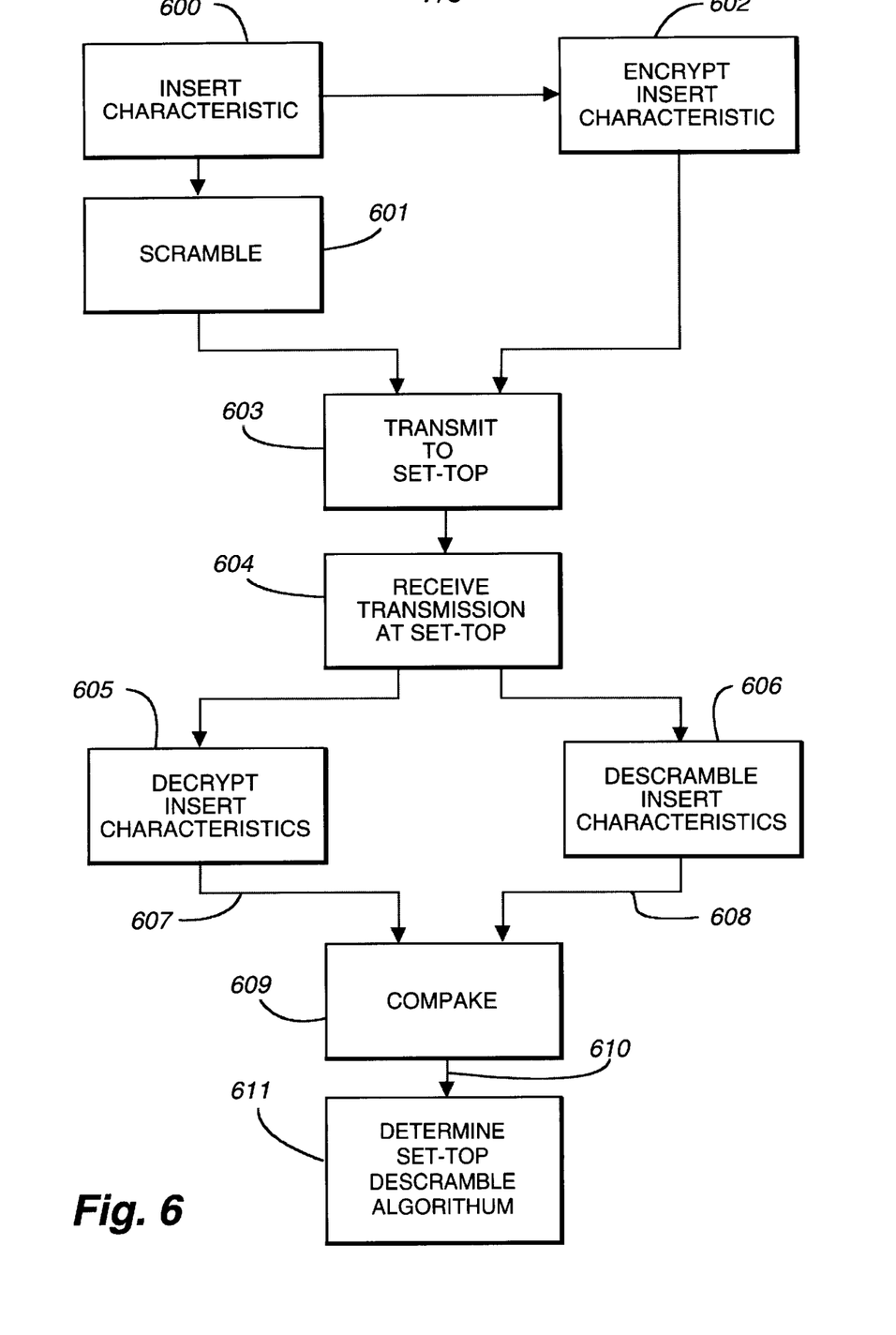
FIG. 6 is another showing of the present invention in flowchart form.

FIGS. 4 and 5 are flowchart showings of the present invention, and more specifically, FIG. 4 shows the operation of the present invention as it takes place at the head end of cable system 10 of FIG. 2, whereas FIG. 5 shows the operation of the present invention as it takes place at an authorized set-top, such as 20 of FIG. 2. While FIGS. 4 and 5 have been characterized as flowchart showings, and are usually associated with the explanation of a method, it well be apparent to those of skill in the art, and it is intended herein, that the showing of these two figures also provides a description of apparatus/logic that is constructed and arranged to implement the various functions defined by these two figures.

With reference to FIG. 4, at function 60, an insert-reference or insert-marker is inserted into the TV picture, for example into one or more horizontal scan lines of the TV picture, for example as was above-described relative to FIG. 3. At function 61 the TV picture, i.e. its scan line or lines, is system-scrambled, for example by using the vendor-A's system-scrambler 12 of FIG. 2. The resultant scrambled TV transmission is transmitted to all of the N set-tops that are within cable system 10 of FIG. 2, as shown by function 62.

At function 63, the insert-reference characteristics, for example the color/electrical-magnitude/line-location characteristics as above described, are encrypted-using a currently-operable encryption algorithm. As will be appreciated by those of skill in the art, it is advisable for security reasons that the encryption algorithm of function 63 be periodically changed. The resultant encrypted message of function 63 is transmitted to all of the N set-tops that are within cable system 10 of FIG. 2, as shown by function 62.

In addition, a selective viewing-authorization, and a decryption algorithm that is compatible with the currently-operable encryption algorithm of function 63, are generated at function 64, and at function 65 this authorization-message is sent to only addressed ones of the system N set-tops.

With reference to FIG. 5, at decision function 70, a determination is made relative to the set-top address that is provided by FIG. 4's address function 65. Assume that the output of function 65 is addressed to vendor-B set-top 20 of FIG. 2.

In this assumed case, function 70 generates a yes output, and function 71 is thereby enabled to establish the decryption algorithm at set-top 20, as this decryption algorithm is defined by the output of FIG. 4's function 64. As a result, function 72 operates to (1) decrypt the FIG. 4 function 63 encrypted reference characteristics, and (2) operates to provide an output 73 that comprises a reconstruction of the insert reference that was initially provided by FIG. 4's function 60.

At vendor-B set-top 20, descrambler 23 operates, under the control of a currently-running descramble algorithm, to descramble the vendor-A scrambled reference characteristic, i.e. the reference characteristic portion of the output of FIG. 4's function 61. This descramble operation is shown at function 74 of FIG. 5. Output 75 of function 74 comprises a reconstruction of the insert reference, as this insert reference appears after descrambling the output of FIG. 4's function 62 using the currently-running descramble algorithm of FIG. 2's vendor-B descrambler 23.

At compare function or means 76, a comparison is made between (1) output 73 that comprises a reconstruction of the insert reference that was initially provided by FIG. 4's function 60, and (2) this insert reference output 75 as it appears after descrambling using the currently-running descramble algorithm of FIG. 2's vendor-B descrambler 23. Output 77 of function 76 comprises control signal 225 of FIG. 2, and output 77 is used to initialize vendor-B set-top descrambler 23 to be compatible with vendor-A system scrambler 12, as is shown by function 78.

For example, when the currently-running descramble algorithm of FIG. 2's vendor-B descrambler 23 that operates at function 74 happens to be compatible with the scrambling algorithm that is used by vendor-A system scrambler 112 to produce the output of FIG. 4's function 61, then output 77 of function 76 comprises a null or a no-output.

Usually, however, a difference is detected at function 76, and function 78 is operable. Once the vendor-B set-top descrambler 23 is set to be compatible with the vendor-A system scrambler 12, as is shown by function 78, function 79 operates to descramble the TV transmission output of FIG. 4's function 62, and descrambled TV transmission output 80 is applied to TV set 16 that is associated with addressed vendor-B set-top 20 of FIG. 2.

The present invention operates with the assumption that for any given TV picture scan line, it is unknown if the scan line will be scrambled by the cable system's scrambler apparatus, and in addition, when the scan line is, in fact scrambled, the inversion axis that is used by the cable system's scrambler apparatus when scrambling the scan line is unknown.

Figure 7:
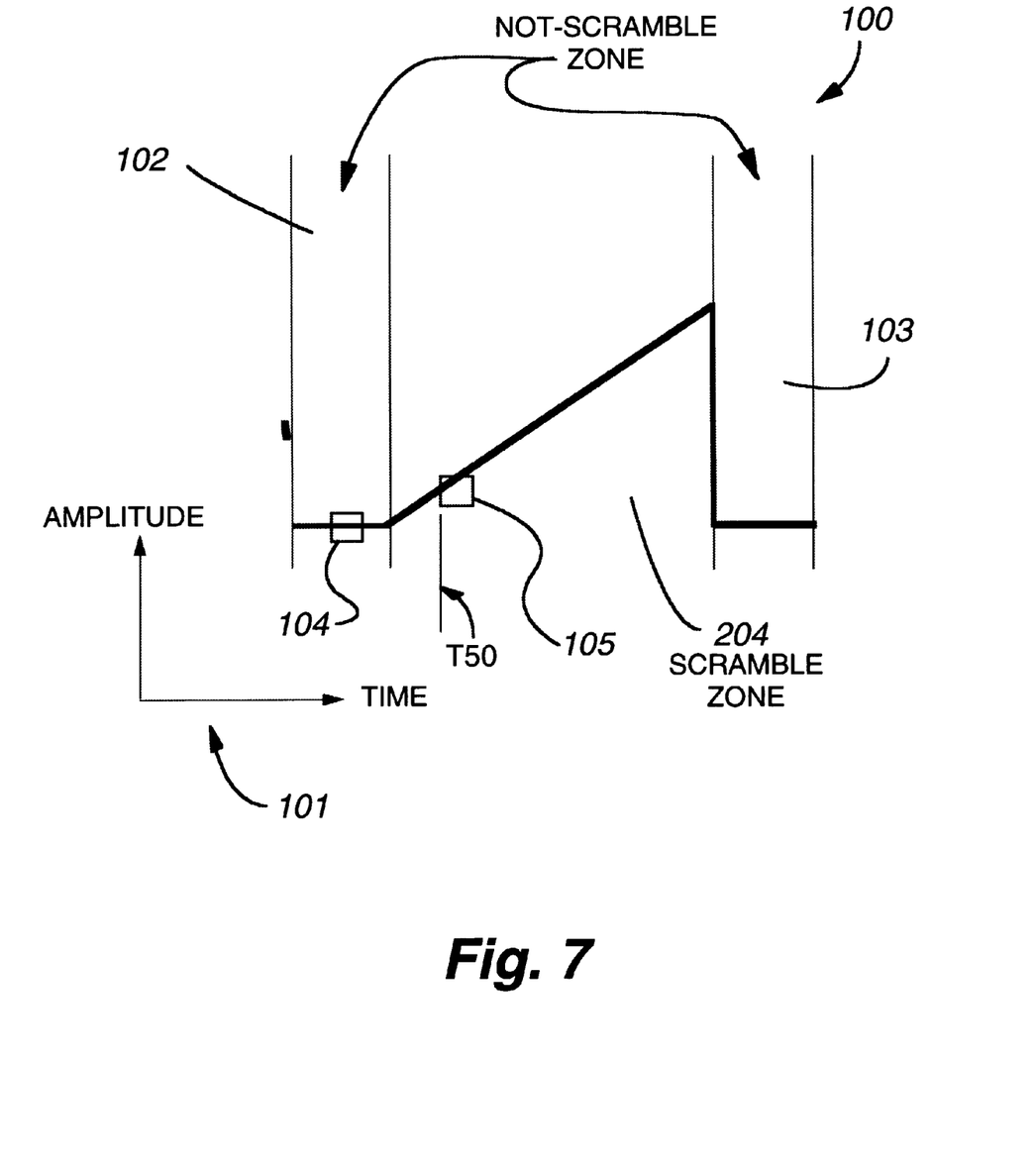
FIG. 7 shows a simplified form of one TV picture scan line and its associated time/amplitude coordinate system in accordance with the invention, wherein the scan line is divided into three basic portions, two portions of which will not be scrambled, and a picture-portion of which that may or may not be scrambled by a well known video-inversion scrambling apparatus, process or algorithm.

FIG. 7 shows a simplified form of one TV picture scan line 100 and its associated time/amplitude coordinate system 101. Scan line 100 has been divided into its three basic portions, i.e. portions 102 and 103 that will never be scrambled, and portion 204 that may or may not be scrambled by a well-known video-inversion scrambling apparatus, process or algorithm.

In accordance with the present invention, a first insert 104 is placed within non-scramble zone 102. Insert 104 is configured to carry two pieces of information, i.e. (1) insert-magnitude-information, such as for example the binary equivalent of the decimal number "10", and (2) scan-line-location information that indicates whereat on the horizontal time axis of scan line 100 a second insert 105 will be found within portion 204 of scan line 100. In this example, the scan-line-location of second insert 105 has been defined as "T50".

Second insert 105 is configured to carry the identical insert-magnitude-information that is contained in first insert 104, and in this example, the binary equivalent of the decimal number "10".

Figure 8:
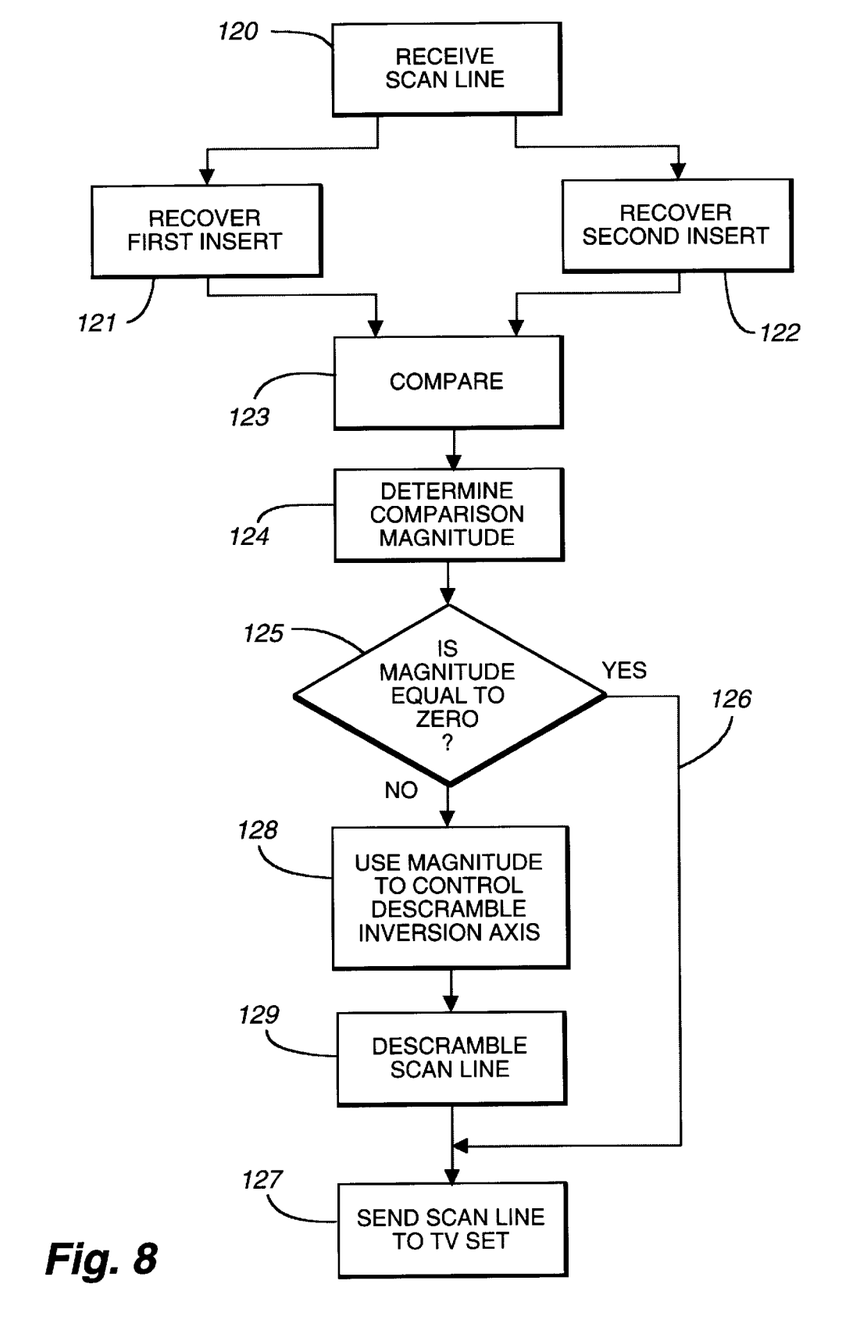
FIG. 8 shows an operation of the present invention relative to the manner in which the first and second inserts of FIG. 7 are used in order to process the FIG. 7 scan line in accordance with the invention.

FIG. 8 shows the operation of the present invention relative to the manner in which first and second inserts 104,105 are used to process scan line 100.

As a first step 120 in FIG. 8, scan line 100 of FIG. 7 is received by an authorized set-top. In this explanation of the present invention, it will be assumed that the information content "10" of first insert 104 has been encrypted at the cable system's head end, and that the authorized set-top has received both this encrypted message and the related decryption algorithm.

Using this decryption algorithm, and using the scan-line-location information from first insert 104, functions 121 and 122 operate to (1) recover the magnitude information, for example "10" from first insert 104, and (2) recover the scrambled and then descrambled magnitude information from second insert 105. At function 123, these two magnitudes are compared, and any difference is recorded at function 124.

In the event that received scan line 120 has not been scrambled/inverted, then these two magnitudes 121,122 are equal, the magnitude recorded at 124 is equal to zero, and yes output 126 of decision function 125 enables function 127 to send the not-scrambled scan line to the set-top's TV set.

When received scan line 120 has in fact been scrambled/inverted, then the insert-magnitude-information portion of second insert 105 has been altered by the video inversion of the scan line's portion 204. For example, the original binary equivalent of the decimal number "10" has been changed to the binary equivalent of the decimal number "7". The magnitude of this difference 124, in this case "3", of course, varies as a function of the inversion axis that was used by the cable system's scrambler apparatus.

Thus, function 128 is enabled to use this magnitude difference of "3" to control, or set, the video inversion axis of the set-top's descrambler apparatus, process or algorithm. Once the set-top's descrambler apparatus has been set to be compatible with the cable system's scrambler apparatus, function 129 operates to descramble the received scan line, and the descrambled scan line is sent to the set-top's TV set, as is indicated at function 127.

While the present invention has been described in detail by making reference to detailed embodiments thereof, this detailed description should not be taken as a limitation on the spirit and scope of the present invention, since it is apparent that those of skill in the art will, upon learning of this invention, readily visualize yet other embodiments that are within the spirit and scope of this invention.

What is claimed is:

1. A method for descrambling a TV-transmission that has been scrambled using a scrambler that utilizes an unknown scrambling technique, comprising the steps of:
   inserting a known insert-portion into said TV-transmission prior to scrambling said TV-transmission using said unknown scrambling technique;
   providing a controllable descrambler;
   sending information describing said known insert-portion to said controllable descrambler;
   sending said scrambled TV-transmission, including said scrambled known insert-portion, to said controllable descrambler;
   descrambling said scrambled known insert-portion at said controllable descrambler to thereby generate a descrambled version of said known insert-portion;
   comparing said descrambled version of said known insert-portion to said information describing said known insert-portion, to thereby generate a difference signal; and
   utilizing said difference signal to enable said controllable descrambler to descramble said scrambled TV-transmission.

2. The method of claim 1 wherein said step of sending said information describing said known insert-portion to said controllable descrambler includes the steps of:
   encoding said information describing said known insert-portion; and
   decoding said encoded information describing said known insert-portion prior to said comparison step.

3. The method of claim 2 including the step of:
   sending an authorization signal to said controllable descrambler enabling said controllable descrambler to descramble said scrambled TV-transmission.

4. The method of claim 1 wherein said known insert-portion comprises a portion of a vertical blanking interval of said TV-transmission.

5. The method of claim 4 wherein said step of sending said information describing said known insert-portion to said controllable descrambler includes the steps of:
   encrypting said information describing said known insert-portion; and
   decrypting said encoded information describing said known insert-portion prior to said comparison step.

6. The method of claim 5 including the step of:
   sending an authorization signal to said controllable descrambler enabling said controllable descrambler to descramble said scrambled TV-transmission.

7. Apparatus for descrambling a TV transmissions that has been scrambled using an unknown scrambling apparatus, comprising:
   inserting means for inserting a known characteristic into said TV transmission prior to scrambling said TV transmission using said unknown scrambling apparatus;
   said unknown scrambling apparatus thereby operating to generate a scrambled version of said known characteristic;
   controllable descrambler apparatus for descrambling said scrambled TV transmission;
   first transmission means for sending said scrambled version of said known characteristic to said controllable descrambler apparatus;
   said controllable descrambler apparatus thereby operating to descramble said scrambled version of said known characteristic;
   second transmission means for sending an unscrambled version of said known characteristic to said controllable descrambler apparatus;
   comparing means at said controllable descrambler apparatus for comparing said descrambled version of said known characteristic to said unscrambled version of said known characteristic, to thereby generate a difference signal that is a function of differences that exist between said descrambled version of said known characteristic and said unscrambled version of said known characteristic; and
   control means at said controllable descrambler responsive to said difference signal and operable to enable said controllable descramble apparatus to descramble said TV transmission.

8. The apparatus of claim 7 including:
   encoding means for encoding said known characteristic prior to operation of said second transmission means; and decoding means at said controllable descrambler apparatus for decoding said known characteristic prior to operation of said comparing means.

9. The apparatus of claim 8 wherein said encoding means comprises an encryption apparatus operating to implement an encryption algorithm, and including:

third transmission means for sending said encryption algorithm to said controllable descrambler.

10. The apparatus of claim 9 including:

fourth transmission means for sending an authorization signal to said controllable descrambler apparatus to enable said controllable descrambler apparatus to descramble said TV transmission only upon receiving a said authorization signal.

11. A method for descrambling a TV transmission that has been scrambled using an unknown scrambling algorithm, comprising the steps of:

inserting a known characteristic into said TV transmission prior to scrambling by said unknown scrambling algorithm;

generating an encrypted message that defines said inserted characteristic in an unscrambled form;

sending a said scrambled TV transmission, a said scrambled inserted characteristic, and said encrypted message to a plurality of set-tops;

providing an authorization signal to selected ones of said plurality of set-tops;

providing a set-top descrambler at each of said set-tops, said set-top descramblers at said selected ones of said plurality of set-tops operating to descrambling said scrambled inserted characteristic;

providing set-top decryptor apparatus at each of said set-tops, said set-top decryptor apparatus at said selected ones of said plurality of set-tops operating to reproduce said inserted characteristic;

providing comparing apparatus at each of said set-tops, said comparing apparatus at said selected ones of said plurality of set-tops operating to compare said reproduced inserted characteristic to said descrambled inserted characteristic, and thereby operating to generate a control signal as a function of said comparison; and connecting said control signal generated at each of said selected ones of said plurality of set-tops to said set-top descrambler at each of said selected ones of said plurality of set-tops, to thereby descramble said scrambled TV transmission at each of said selected ones of said plurality of set-tops.

12. The method of claim 11 wherein said encrypted message is inserted into the VBI and/or the OOB of said TV transmission.

13. The method of claim 11 wherein said authorization signal is inserted into the VBI and/or the OOB of said TV transmission.

14. A video-inversion scramble detection apparatus for use in descrambling a TV cable system's TV transmission that has been scrambled using a system scrambling algorithm, the apparatus comprising:

insertion apparatus operating to insert an insert-characteristic into said TV transmission prior to scrambling said TV transmission and said insert-characteristic, by said system scrambling algorithm;

encryption apparatus operating to generate an encrypted message that defines an unscrambled form of said insert-characteristic;

cable system transmission means for transmitting said scrambled TV transmission, said scrambled insert-characteristic, and said encrypted message to a plurality of set-tops that are within said cable system;

cable system authorization apparatus for transmitting an authorization signal to certain ones of said plurality of set-tops;

set-top descrambler apparatus at each of said plurality of set-tops, said set-top descrambler apparatus at said certain ones of said set-tops operating to descramble said scrambled insert-characteristic;

set-top decryption apparatus at each of said plurality of set-tops, said decryption apparatus at said certain ones of said set-tops operating to decrypt said encrypted message to thereby reproduce said insert-characteristic;

comparing apparatus at each of said plurality of set-tops, said comparing apparatus at said certain ones of said set-tops operating to compare said descrambled insert-characteristic with said reproduced insert-characteristic, and thereby generating a control signal that varies as a function of said comparison; and control means at each of said certain ones of said set-tops operating to connect said control signal to said set-top descrambler at said certain ones of said set-tops, said control means operating to cause said set-top descramblers to descramble said scrambled TV transmission.

15. The detection apparatus of claim 14 wherein said encrypted message is transmitted to said plurality of set-tops within a VBI and/or an OOB channel of said cable system transmission means.

16. The detection apparatus of claim 15 wherein said authorization signal is transmitted to said certain ones of said plurality of set-tops within a VBI and/or an OOB channel of said cable system transmission means.

17. A cable TV system comprising:

a headend having (1) a TV picture source that provides a viewable TV picture signal, (2) insert apparatus operable to combine first and second identical inserts at first and a second locations, respectively, within said TV picture signal, (3) a system scrambler operable to receive said combined signal, said system scrambler operable to scramble only said TV picture signal and said first insert, and (4) transmission means operable to remotely transmit said scrambled TV picture signal, said scrambled first insert, and said second insert;

a first plurality of compatible set-tops remote from said headend, each of said compatible set-tops operating to receive said transmission from said headend, each of said compatible set-tops having a descrambler that is compatible with said system scrambler, each of said compatible set-tops operating to descramble said transmission from said headend, and each of said compatible set-tops operating to provide a descrambled TV picture signal to an associated TV set; and a second plurality of non-compatible set-tops remote from said headend, each of said non-compatible set-tops operating to receive said transmission from said headend, each of said non-compatible set-tops having a controllable descrambler that is controllable in a manner to be compatible with said system scrambler, each of said non-compatible set-tops initially operating to descramble said transmission from said headend to thereby provide a descrambled version of said scrambled first insert, each of said non-compatible set-tops having comparison apparatus for comparing (1) said descrambled version of said scrambled first insert and (2) said second insert received from said headend, said comparison apparatus within each of said non-compatible set-tops operating to generate a control signal to a said controllable descrambler within each of said non-compatible set-tops, said controllable descrambler apparatus within each of said non-compatible set-tops thereby providing a compatible descrambled TV picture signal to an associated TV set.

18. The cable TV system of claim 17 wherein:

said head end includes first conditional access apparatus having a first output operable to enable only certain ones of said first plurality of compatible set-tops to descramble said remotely transmitted and scrambled TV picture signal, and second conditional access apparatus having a second output operable to enable only certain ones of said second plurality of non-compatible set-tops to descramble said remotely transmitted and scrambled TV picture signal and scrambled first insert;

said headend operating to remotely transmit said first and second outputs addressed only to said certain ones of said first plurality of compatible set-tops, and said certain ones of said non-compatible set-tops, respectively.

19. The cable TV system of claim 17 wherein said headend includes:

encryption apparatus operable to encrypt said second insert prior to said transmission means operating to remotely transmit said scrambled TV picture signal, said scrambled first insert, and an encrypted second insert;

each of said second plurality of non-compatible set-tops including decryption apparatus operable to generate said second insert from said encrypted second insert within said head end transmission.

20. The TV cable system of claim 19 wherein:

said head end includes first conditional access apparatus having a first output operable to enable only certain ones of said first plurality of compatible set-tops to descramble said remotely transmitted and scrambled TV picture signal, and second conditional access apparatus having a second output operable to enable only certain ones of said second plurality of non-compatible set-tops to descramble said remotely transmitted and scrambled TV picture signal and scrambled first insert, said second output;

said headend operating to remotely transmit said first and second outputs addressed only to said certain ones of said first plurality of compatible set-tops, and said certain ones of said non-compatible set-tops, respectively.

* * * * *